I. COHEN.
SHOVEL OR SPADE PLOW.
APPLICATION FILED DEC. 12, 1917.
1,328,913.
Patented Jan. 27, 1920.
3 SHEETS—SHEET 1.
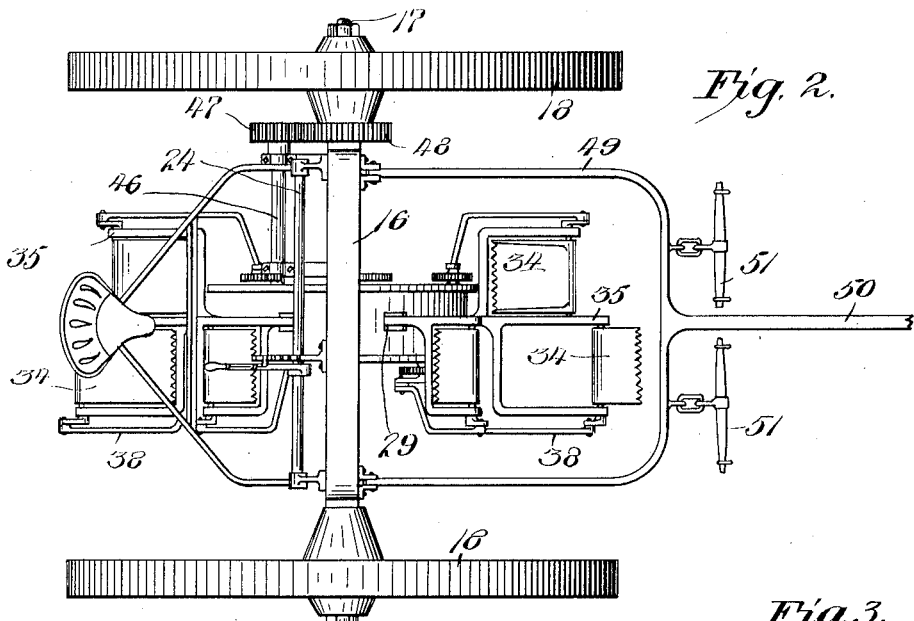
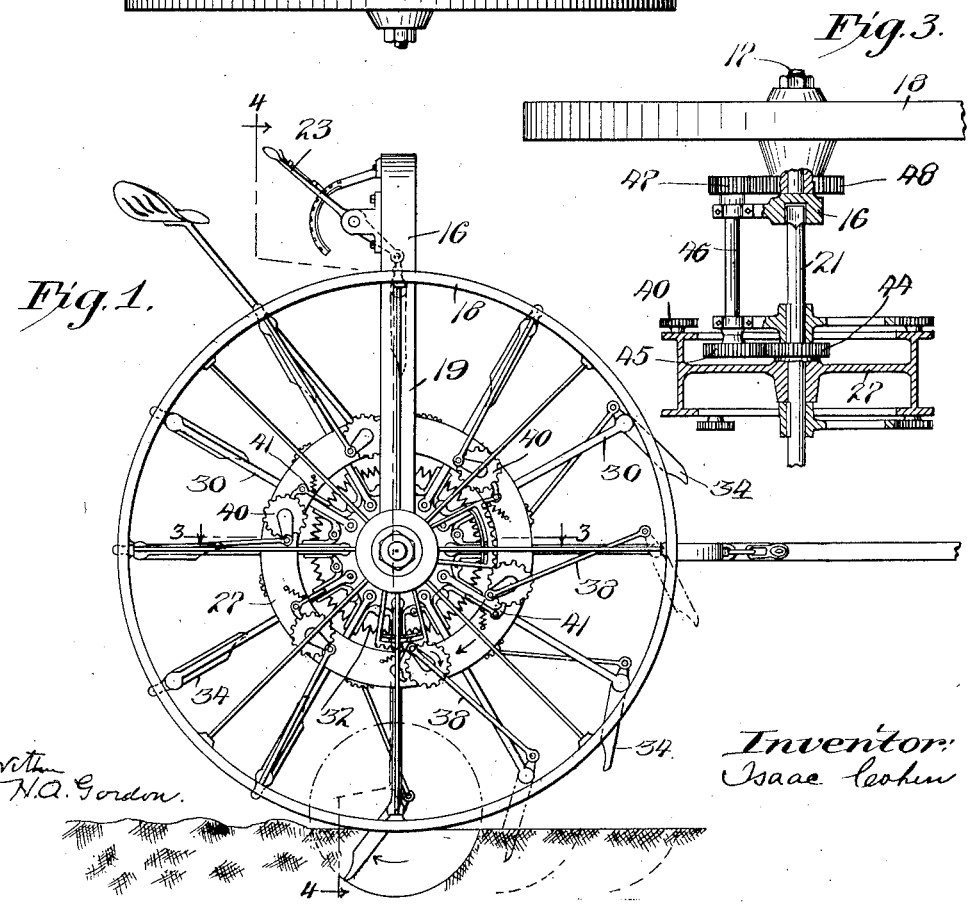

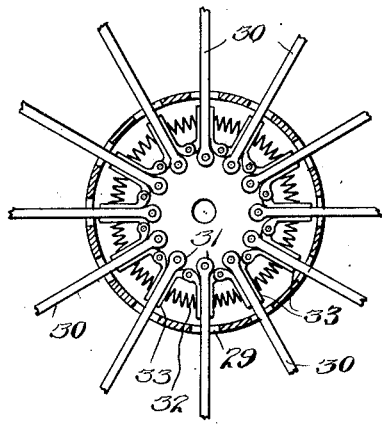
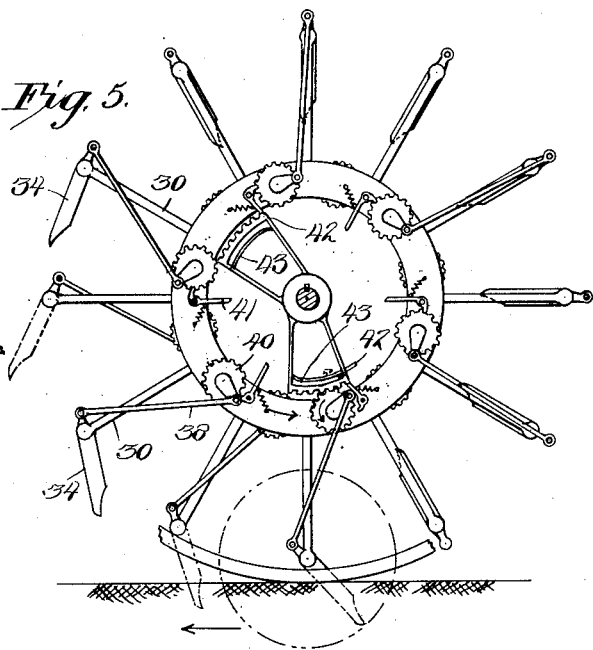
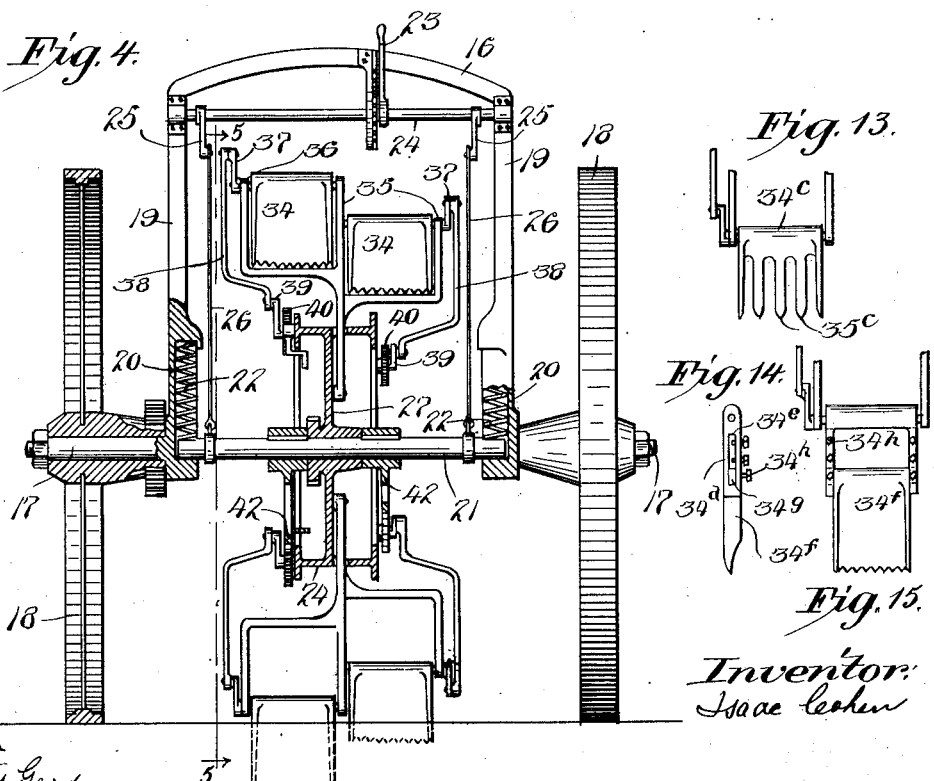
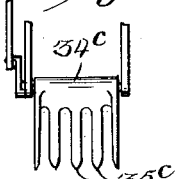
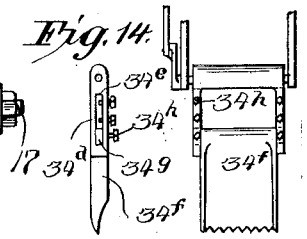

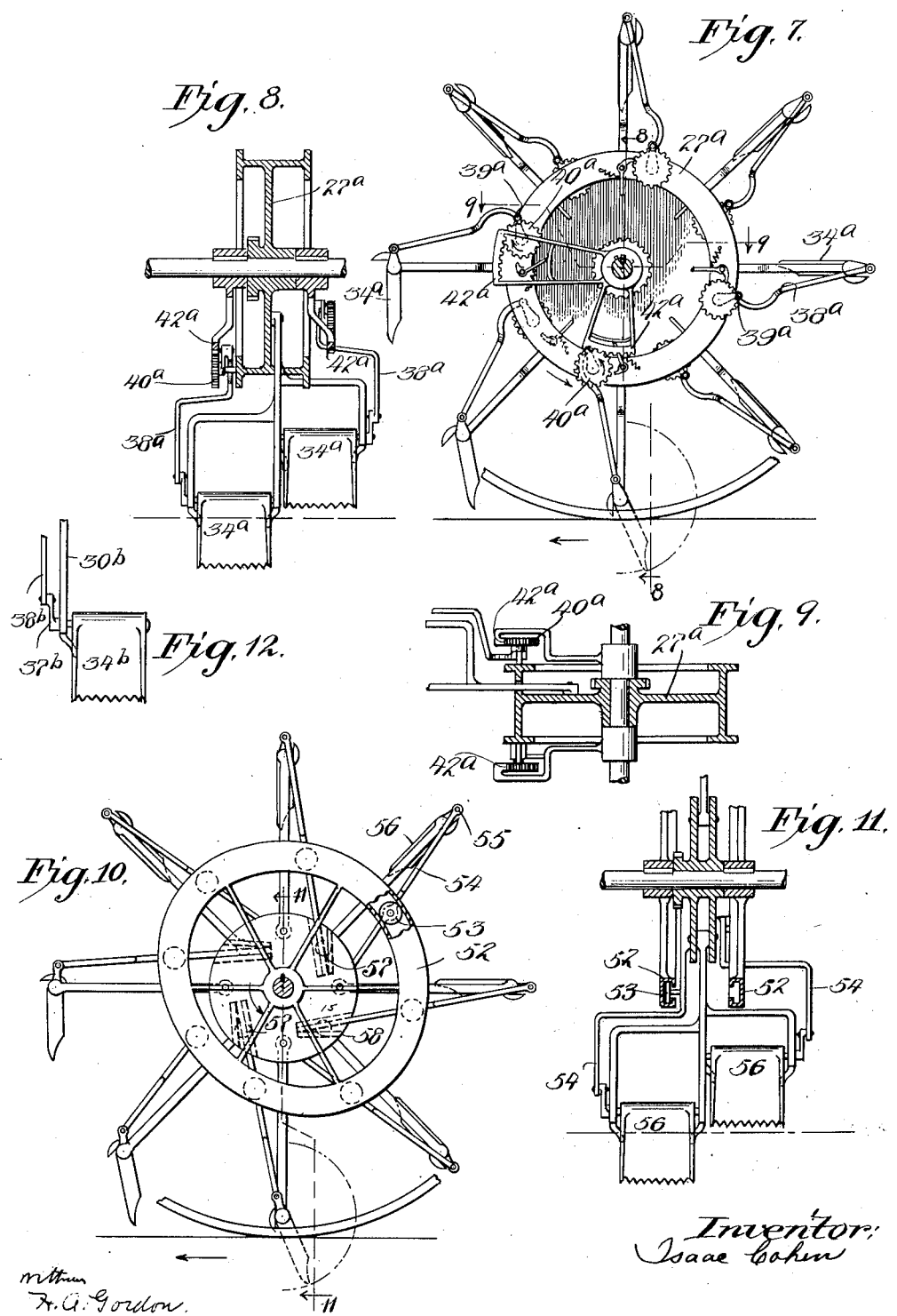

UNITED STATES PATENT OFFICE.

ISAAC COHEN, OF SCHENECTADY, NEW YORK.

SHOVEL OR SPADE PLOW.

1,328,913.  Specification of Letters Patent.  Patented Jan. 27, 1920.

Application filed December 12, 1917. Serial No. 206,811.

*To all whom it may concern:*

Be it known that I, ISAAC COHEN, a citizen of the United States, residing at Schenectady, in the county of Schenectady and State of New York, have invented a new Shovel or Spade Plow, of which the following is a specification.

The present invention relates to improvements in apparatus for plowing the ground, and the primary object is to provide mechanism in which an endless series of shovels is employed that successively enter, dig up and turn over the ground as the apparatus is moved thereover, whereby a digging or spading operation is effected at relatively great speed.

A further object is to provide means that will dig deeply, the depth of the digging operation being variable to suit the conditions encountered.

In the accompanying drawings:—

Figure 1 is a side elevation of one embodiment of the invention,

Fig. 2 is a plan view of the same,

Fig. 3 is a horizontal detail sectional view on the line 3—3 of Fig. 1,

Fig. 4 is a vertical sectional view on the line 4—4 of Fig. 1,

Fig. 5 is a sectional view on the line 5—5 of Fig. 4,

Fig. 6 is a detail sectional view through the main supporting drum.

Fig. 7 is a sectional view corresponding to Fig. 5, but showing a slightly modified form of construction.

Fig. 8 is a cross sectional view on the line 8—8 of Fig. 7,

Fig. 9 is a sectional view on the line 9—9 of Fig. 7,

Fig. 10 is a side elevation of another embodiment of the invention,

Fig. 11 is a sectional view on the line 11—11 of Fig. 10.

Fig. 12 is a detail view in elevation of a modified form of shovel support,

Fig. 13 is a view in elevation of another embodiment of a digging or shovel member, Fig. 14 is an edge view of another embodiment of the shovel or digging member, and Fig. 15 is a front elevation of the same.

Similar reference numerals designate corresponding parts in all the figures of the drawings.

In the embodiment disclosed an arched axle 16 is employed, having terminal spindles 17 on which are journaled supporting and traction wheels 18. The upright standard portions 19 of the axle have their lower portions provided with vertical grooves 20 in which is slidably mounted a fixed shaft 21 that bridges the space between said standard portions. This shaft is yieldingly urged to the lower end of the grooves by coiled springs 22. The shaft can be raised and lowered by means of a hand lever 23 fixed to a rock shaft 24 that is journaled on the upper ends of the standards 19, and this rock shaft is provided with crank arms 25 connected by links 26 to the shaft 21.

Journaled on the central portion of the shaft 21 is a drum 27, having a peripheral wall 28 provided with slots 29 shown more particularly in Fig. 6. A plurality of radial arms 30 pivoted at 31 to the drum within the same pass through the slots 29. These arms are normally held against relative swinging movement by means of interposed coiled springs 32 bearing against shoes 33 that are mounted within the drum, said shoes in turn bearing against the opposite sides of the arms 30.

These arms 30 may each carry one or more digging or shovel elements, and in the embodiment illustrated in Figs. 1–6, each has mounted thereon two shovel elements 34. To this end the outer portions of the arms are provided with brackets 35 in which the said shovel arms are pivoted, as shown at 36, and the pivots have outstanding crank arms 37. The crank arms 37 are connected by links 38 with crank arms 39 fixed to pinions 40 that are journaled on the sides of the drum 27. These pinions are normally held against rotation by latches 41 engaged therewith, and the pinions during the rotation of the drum, are arranged to mesh with fixed gear segments 42 mounted upon the fixed shaft 21. The segments 42 also carry cam tracks 43 that are engaged by the inner ends of the latches 41.

For the purpose of rotating the drum 27, said drum, as shown in Fig. 3 carries a gear wheel 44 with which meshes a gear wheel 45 that is fixed to a shaft 46, and this shaft has a pinion 47 in mesh with a gear wheel 48 on one of the wheels 18. Consequently when the machine is drawn over the ground, it will be evident that the rotation of the wheel 18 will transmit motion to the shaft 46, and this, in turn, will rotate the drum 27, carrying the shovel members with it. As the shovels pass the upper gear segment 42, illustrated in Fig. 5, the latches 41 will engage the cam track 43, and thereby be disengaged from the pinions 40, and immediately the positioning pinion will mesh with the gear segment and cause the shovel to be moved to its digging position, as illustrated at the left of Fig. 5. Then, as the drum continues to rotate, the shovels will successively be caused to enter the ground, and when at the greatest depth the gears will engage the lower gear segment, causing the shovel to be swung upwardly, elevating the dirt and turning it over. The machine may be propelled by any suitable means. Thus, in Figs. 1 and 2 there is illustrated a yoke 49 pivoted to the arched axle, and having a tongue 50 projecting therefrom, with suitable whiffle trees 51 on opposite sides of the tongue, to which the draft animals may be hitched.

The embodiment disclosed in Figs. 7, 8 and 9 shows a structure in which the means for individually actuating the shovels or digging members is slightly different. The drum is designated $27^a$, and the digging elements $34^a$, the same being connected by links $38^a$ with crank arms $39^a$ carried by pinions $40^a$. The gear segments $42^a$ are shown substantially at right angles to each other, the lower one being an external gear and the upper an internal gear. It will be obvious that the action is substantially the same, except that the upper gear segment $42^a$, which positions the shovels or digging elements moves the same in a direction opposite to the corresponding gear segment 42 of the structure disclosed in Figs. 1-6 inclusive.

In the mechanism illustrated in Figs. 10 and 11, the shovel actuating means is shown in the form of cams 52, having internal trackways in which operate rollers 53. These rollers are carried by links 54 pivoted as shown at 55 to the digging elements 56, the inner ends of the links 54 having sliding bearings 57 on the drum 58. The results obtained are substantially the same as those described above. That is to say, as the machine is drawn over the ground, the shovels will be properly positioned to dig into the ground, and after they have entered the same, will be caused to turn and throw the earth upwardly and over, as indicated in Fig. 10.

Instead of a pair of shovels for each of the outstanding arms 30, a single set of shovels may be employed, and as illustrated in Fig. 12 each arm $30^b$ may have a single shovel element $34^b$ journaled in its outer end and provided with a crank $37^b$ connected by a link $38^b$ with the operating mechanism above set forth.

The shovels themselves may be made in different ways. Thus in Fig. 13 a digging element $34^c$ is shown having teeth $35^c$ corresponding to a spading fork. The shovels may also be made extensible, as shown in Figs. 14 and 15. Thus spaced guide arms $34^d$ may be employed which are slotted, as shown at $34^e$ and a shovel blade $34^f$ is provided with projections $34^g$ slidably mounted on the slots and adapted to be held in any desired position by set screws $34^h$.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new and desire to secure by Letters Patent, is:—

1. In apparatus of the character described, the combination with a support, of a rotatable drum mounted thereon, means for rotating the drum, a plurality of shovel supports yieldingly mounted on the drum, shovels carried by the supports, and means for automatically moving the shovels on the supports when the shovels are engaged in the earth.

2. In apparatus of the character set forth, the combination with a supporting frame, of a rotatable drum mounted thereon, radial arms pivoted on the drum, springs acting on the arms to oppose their lateral swinging movement, in both directions, digging elements mounted on the arms, and means for moving the digging elements on the arms when engaged in the earth.

3. In apparatus of the character set forth, the combination with an arched axle, of wheels supporting the same, a shaft mounted in the arch of the axle, a drum carried by the shaft, means for rotating the drum from one of the wheels, arms pivoted on the drum, springs interposed between the arms, digging elements pivoted on the arms, and means for turning the digging elements during the rotation of the drum.

4. In apparatus of the character described, the combination with a rotatable carrier drum, of outstanding arms mounted thereon, digging elements pivoted on the arms, means for presenting the digging elements in position to enter the earth upon the rotation of the drum, and means for causing the digging elements to rotate on their own axis when engaged in the earth.

5. In apparatus of the character described, the combination with a rotatable carrier drum, of pivotally mounted digging elements mounted thereon, gears connected to the digging elements for effecting their pivotal movements, and gear segments periodically engaged by the gears upon the rotation of the drum for operating the gears and thereby operating the digging elements.

6. In apparatus of the character described, the combination with a rotatable drum, of substantially radial arms carried thereby, digging elements pivotally mounted on the arms, gears journaled on the drum, link connections between the gears and digging elements, and fixed gear segments engaged by the gears during the rotation of the drum for effecting the operation of the gears and the pivotal movement of the digging elements.

7. In apparatus of the character set forth, the combination with a frame, of wheels carrying the same, a rotatable drum mounted on the frame, means for rotating the drum from one of the wheels, radial arms pivoted on the drum, springs for yieldingly resisting the swinging movement of the arms, digging elements pivoted on the arms, gears journaled on the drum and having link connections with the digging elements, and fixed gear segments engaged by the gears upon the rotation of the drum.

This specification was drawn December 10th, 1917, and the name of the machine specified in said specifications, to be known as the "shovel plow."

ISAAC COHEN.